United States Patent
Ehmann et al.

(10) Patent No.: US 6,931,524 B2
(45) Date of Patent: Aug. 16, 2005

(54) SYSTEM FOR BUS MONITORING USING A RECONFIGURABLE BUS MONITOR WHICH IS ADAPTED TO REPORT BACK TO CPU IN RESPONSE TO DETECTING CERTAIN SELECTED EVENTS

(75) Inventors: Gregory E. Ehmann, Sleepy Hollow, IL (US); Swati Saxena, Hoffman Estates, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 814 days.

(21) Appl. No.: 09/942,129

(22) Filed: Aug. 29, 2001

(65) Prior Publication Data

US 2003/0046522 A1 Mar. 6, 2003

(51) Int. Cl.[7] .............................. G06F 9/00; G06F 3/00; G06F 13/00
(52) U.S. Cl. .............................. 713/100; 713/1; 710/15; 710/104
(58) Field of Search ....................... 713/1, 100; 710/15, 710/104; 714/39; 702/186

(56) References Cited

U.S. PATENT DOCUMENTS

| | | | | |
|---|---|---|---|---|
| 4,085,448 A | * | 4/1978 | Kogge | 710/107 |
| 5,029,070 A | * | 7/1991 | McCarthy et al. | 711/143 |
| 5,640,600 A | * | 6/1997 | Satoh et al. | 710/33 |
| 5,729,678 A | * | 3/1998 | Hunt et al. | 714/43 |
| 5,778,194 A | * | 7/1998 | McCombs | 713/600 |
| 6,351,724 B1 | * | 2/2002 | Klassen et al. | 702/186 |
| 6,601,193 B1 | * | 7/2003 | Liebau | 714/39 |
| 6,618,775 B1 | * | 9/2003 | Davis | 710/100 |
| 6,751,753 B2 | * | 6/2004 | Nguyen et al. | 714/39 |
| 6,760,852 B1 | * | 7/2004 | Gulick | 713/324 |

FOREIGN PATENT DOCUMENTS

| | | | |
|---|---|---|---|
| EP | 0 897 152 | | 2/1999 |
| EP | 0 997 819 | | 5/2000 |
| JP | 5-216820 | * | 8/1993 |
| JP | 9-160843 | * | 6/1997 |

\* cited by examiner

*Primary Examiner*—Chun Cao
(74) *Attorney, Agent, or Firm*—Peter Zawilski

(57) ABSTRACT

An adaptive data communication approach permits communication bus monitoring by using a reconfigurable bus monitor built into the CPU bus structure and adapted to report back to the CPU in response to detecting certain CPU-programmed events. In one particular example embodiment, a circuit arrangement having a CPU circuit communicates with another device over a communication channel while a reconfigurable circuit monitors the communication channel. The CPU circuit configures the reconfigurable circuit for monitoring any of various types of event expected to occur on the communication channel. The reconfigurable circuit collects signals passed on the communication channel and reports back to the CPU circuit when data indicative of the first event type occurs on the communication channel. In response to the data indicative of the monitored event, the CPU circuit reconfigures the reconfigurable circuit to monitor for another event type occurring on the communication channel and thereby permits for an adaptive evaluation of the communication channel. Another aspect of the invention is directed to the CPU redirecting data communication in response to this adaptive evaluation.

27 Claims, 2 Drawing Sheets

SYSTEM FOR BUS MONITORING USING A RECONFIGURABLE BUS MONITOR WHICH IS ADAPTED TO REPORT BACK TO CPU IN RESPONSE TO DETECTING CERTAIN SELECTED EVENTS

FIELD OF THE INVENTION

The present invention is directed generally to data communication. More particularly, the present invention relates to methods and arrangements for monitoring data-based events on a communication channel.

BACKGROUND OF THE INVENTION

The electronics industry continues to strive for high-powered, high-functioning circuits. Significant achievements in this regard have been realized through the development of very large-scale integrated circuits. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces that are designed to ensure that data integrity is maintained while using circuit designs are sensitive to practicable limitations in terms of implementation space and available operating power.

The increased demand for high-powered, high-functioning semiconductor devices has lead to an ever-increasing demand for increasing the speed at which data is passed between the circuit blocks. Typically, these communication applications are implemented using parallel or serial data transmission, and more often via parallel data transmission. In applications using parallel data transmission, a typical implementation would include sending multiple data bits simultaneously across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel), for example, in the form of a cable, a backplane circuit, a bus structure internal to a chip, other interconnect, or any combination of such communication media. A sending module transmits data over the bus synchronously with a clock on the sending module. In this manner, the transitions on the parallel signal lines leave the sending module in a synchronous relationship with each other and/or to a clock on the sending module. At the other end of the parallel data interconnect, the receiving module receives the data on the parallel data bus; where the communication arrangement passes a clock signal, the receive clock is typically derived from or is synchronous with the clock on the sending module. The rate at which the data is passed over the parallel signal lines is sometimes referred to as the (parallel) "bus rate."

In attempting to optimize the efficiency in such systems, it is beneficial to monitor how the data bus and overall communication block are being used. Traditionally, off-board test analyzers and/or built-in event detectors have been used to detect, count or otherwise measure events occurring on the bus. The information gathered from such tools is then evaluated by the system designers for the purpose of improving the design, e.g., board layout or software organization.

For many applications, improving the design in this manner can be burdensome and costly. For instance, the expense associated with the design of systems requiring customized chips does not permit repeatedly cycling through chip-design layouts for the purpose of improving the bus utilization or throughput. Because such chips are customized by functional specifications, e.g., using a hardware-description language (HDL) such as Verilog or VHDL, chip-design layouts are intended to be altered only at the computer simulation stage of the design. After simulation, the chip prototype is validated in silicon but even then unexpected problems are typical. Overcoming these problems involves use of off-board test analyzers and/or built-in event detectors and more iterations of the above process. Unfortunately, due to the highly integrated structure and high operating speeds of such chips, use of off-board test analyzers and/or built-in event detectors can lead to other problems, such as signal timing, noise-coupling and signal-level issues. Repeatedly redesigning and testing, as typically performed, significantly increases the ultimate design time and cost to such a degree that this practice is often intolerable in today's time-sensitive market. Also, built-in event detectors are typically designed simultaneously with the circuit for which they are to monitor; consequently, they are ineffective for monitoring suspect aspects of the circuit that are discovered post-fabrication.

Ways of improving the development of customized chips can lead to improved communication methods and arrangements that find use in a variety of applications. The present invention addresses the need to overcome the above-mentioned deficiencies of customized-chip development and also provides for communication methods and arrangements that are useful for other applications.

SUMMARY OF THE INVENTION

Various aspects of the present invention are directed to an adaptive data communication approach that permits configurable monitoring of a communication bus by using a reconfigurable bus monitor built into the CPU bus structure, with the reconfigurable bus monitor adapted to report back to the CPU in response to detecting certain selected events.

In one particular example embodiment, a circuit arrangement having a CPU circuit communicates with another device over a communication channel while a reconfigurable circuit monitors the communication channel. The CPU circuit configures the reconfigurable circuit for monitoring any of various types of events expected to occur on the communication channel. The reconfigurable circuit collects signals passed on the communication channel and can increment, start or stop counters based on this event, and then report back to the CPU circuit. In response to the monitored event, the CPU circuit reconfigures the reconfigurable circuit to monitor for another event type occurring on the communication channel and thereby permits for an adaptive evaluation of the communication channel. Another aspect of the invention is directed to the CPU redirecting data communication in response to this adaptive evaluation.

In another particular example embodiment, a circuit arrangement includes: a reconfigurable circuit that is coupled to the communication channel and that collect signals passed on the communication channel; and a CPU circuit that communicates with another device over a communication channel and configures the reconfigurable circuit for monitoring a first event type occurring on the communication channel. The reconfigurable circuit is adapted to respond to the CPU circuit by monitoring for the first event type occurring on the communication channel and by reporting back to the CPU circuit data indicative of the first event. The CPU circuit also responds to the data indicative of the monitored event type by reconfiguring the reconfigurable circuit to monitor for another event type occurring on the communication channel and, thereafter, collects and evaluates signals passed on the communication channel for the other event.

In another embodiment which is consistent with the above-described embodiments, the reconfigurable circuit includes a register circuit that responds to configuration data by storing configuration bits that are translated into expected signals that correspond to events to be monitored on the communication channel. The reconfigureable circuit also includes a comparator circuit that compares the collected signals with the expected signals.

Yet other embodiments are directed to the manner in which the reconfigurable circuit communicates with the CPU circuit. In one such implementation, an interruption mechanism is used for interrupting the CPU circuit in response to the collected signals matching the expected signals. In another implementation, a polling mechanism is used between CPU circuit and the reconfigurable circuit to enable the CPU circuit to read the data indicative of the first event. In yet another embodiment, a detected event is used to increment or start/stop a counter that it is adapted to tract.

Other example embodiments of the present invention are directed to various other related aspects including methodology and system-processing aspects of such communication.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
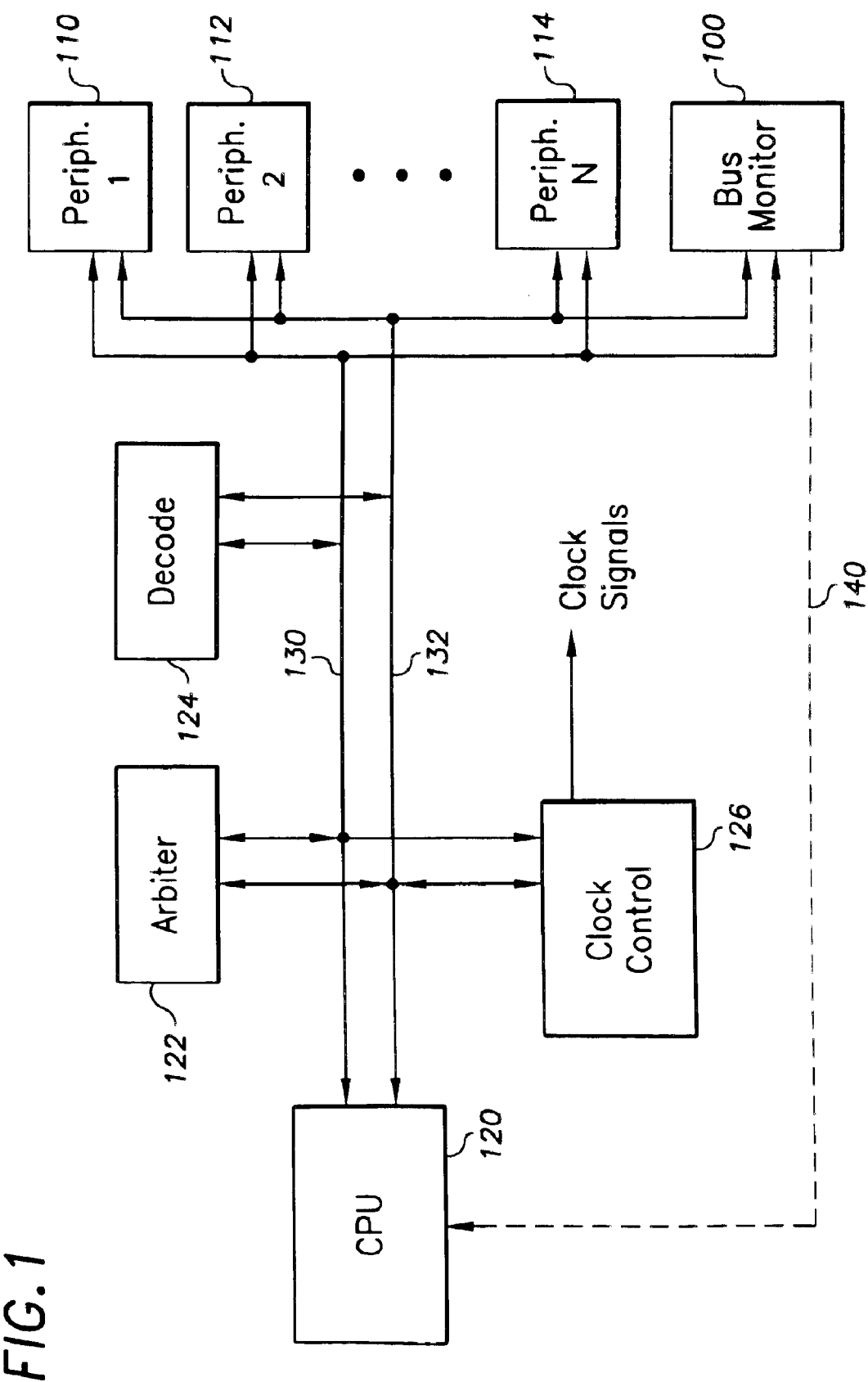
FIG. 1 is a diagram of an example circuit arrangement, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EXAMPLE EMBODIMENTS

The present invention is believed to be generally applicable to methods and arrangements in which data is transferred over a CPU-based communication path. The invention has been found to be particularly advantageous for high-speed data transfer applications in which communication bus monitoring can lead to enhanced validation and/or improved control and throughput in the communication between the devices coupled to the communication bus. Examples of communication busses (including interfaces) include, among others: SSTL (stub series transceiver/terminated logic), RSL (Rambus Signaling Logic) interfaces, closely-connected applications such as where the parallel data communication path intercouples the two modules on a single-chip, and off-board high-speed communication between chips typically situated immediately adjacent each other on the same printed circuit board. While the present invention is not necessarily limited to such applications, an appreciation of various aspects of the invention is best gained through a discussion of examples in such an environment.

In one example embodiment, a single-chip circuit arrangement includes a conventional parallel communication bus used to intercouple a CPU circuit to various bus-communicating devices. The CPU circuit includes the conventional memory mapping circuitry that interfaces with the CPU's control, data and address lines for memory mapping between the CPU and the bus-communicating devices. To monitor various types of events occurring between the bus-communicating devices, the single-chip circuit arrangement also includes a reconfigurable circuit that is coupled to the communication channel for the purpose of monitoring the signals passed on the communication channel. The CPU circuit is designed and programmed to communicate with the other bus-communicating devices over a communication channel and adapted to configure the reconfigurable circuit for monitoring an event or event type, e.g., selected by the CPU, that is expected to occur on the communication channel. Compliant with its configuration, the reconfigurable circuit is adapted to monitor for the event and report back to the CPU circuit that the event has been detected. Using this feedback from the reconfigurable circuit, the CPU circuit determines what, if any, action is required and responds by reconfiguring the reconfigurable circuit for further monitoring of additional events of the same type and/or other event types expected to occur on the communication channel.

The events that can be monitored vary depending on the application and even the dynamic activity flowing across the communication channel (or bus). Depending upon the application, these signals can include all, or any subset of, the control, data, and address signals. For example, in one application, only the control and address signals are monitored for activity such as the frequency of, and/or time between, certain requests for service from a particular peripheral device coupled to the communication bus; in this application, the reconfigurable circuit does not need to monitor or even couple to the data lines of the communication bus. In another application, each of the control, address and data signals are monitored for activity such as a certain number a special code is being written to a particular peripheral device; in this application, the reconfigurable circuit monitors each of the data lines of the communication bus.

The above example embodiment is applicable to various types of bus-coupled data processing arrangements in which one or more clocked circuit blocks are accessed using circuit-block addressing by another circuit block requesting data therefrom over a bus which can be monitored. In this regard, the present invention is not necessarily limited to parallel communication busses but can also include serial communication arrangements such as specified by I2C and RS232-type protocols. With respect to various parallel communications, embodiments of the present invention are directed, for example, to processing arrangements using the Advanced Microcontroller Bus Architecture ("AMBA"), AMBA-Advanced Peripheral Bus ("APB"), high-speed busses such as the Advanced High-performance Bus ("AHB"), and other types of ARM-based data processing arrangements. Other embodiments of the present invention are directed to IBM's CoreConnect on-chip bus and Motorola's IP-bus, and other data high-performance bussing CPU arrangements as further exemplified below.

Referring now to the figures and according to the present invention, FIG. 1 illustrates an example arrangement of a CPU-based data communication arrangement in which a bus (or "communications channel") monitor 100 monitors communication between various circuit blocks 110, 112, etc. and communicatively-coupled CPU circuit 120. The example arrangement of FIG. 1 further includes conventional arbiter and decode circuits 122 and 124 and clock control circuit 126, which provides clock signals for state-advancing and bus-communication timing functions for the bus-coupled devices. When devices compete for control of the communication channel, depicted by control/address bus 130 and data bus 132, arbiter circuit 122 decides which device will be given control. Decode circuit 124 performs the memory mapping functions for the communication in connection with the CPU circuit 120.

The circuit blocks 110, 112, etc. generically represent circuits that can communicate on the bus. These blocks can be commercially available and/or application or customer specific functional blocks. In an example application, the communication channel is implemented as specified by the Advanced System Bus (ASB) standard or the VLSI Peripheral Bus (VPB) bus, and each of these blocks is implemented for communication according to the applicable ASB and VPB standard to effect proper communication using a master/slave relationship. The master/slave communication can be implemented in a number of ways including using the approach described in connection with U.S. patent entitled, *Method And Arrangement For Passing Data Between A Reference Chip And An External Bus,* U.S. Pat. No. 6,154,803, to Pontius et al. In this context, the master is the device or accessing circuit block initiating the communication and the slave is the targeted respondent, or a bus-coupled circuit block within circuit 100) of the initiated communication; in accordance with the applicable standard, the arbiter 122 permits control to be maintained with the master.

In this example arrangement, the bus monitor circuit 100 (which can be a microprocessor, a microcomputer or another logic device) is configured by the CPU circuit 120 to monitor the communication channel for expected (including possible) events defined by all or a subset of the control, address and data lines and/or previous conditions of the communication channel. In response to detecting a bus condition for which the bus monitor circuit 100 was configured, the bus monitor circuit 100 reports back to the CPU circuit 120 via a feedback path 140. The feedback path 140 can be implemented, for example, as an interrupt line connected to an interrupt port of the CPU circuit 120, as CPU-polled data via bus 132 in which the CPU circuit 120 addresses and reads feedback data from the bus monitor circuit 100, or by using a separate line connected to a special data I/O port of the CPU circuit 120. In response, the CPU circuit 120 can then evaluate the data fed back regarding this monitored condition and determine what, if any, action would further facilitate the tasks assigned to the CPU circuit 120 and/or the associated bus-coupled devices. Typically, the CPU circuit 120 responds by reconfiguring the reconfigurable circuit to further monitor for additional events of the same or another type of condition on the communication channel. Examples of such responsive communication management in the arrangement of FIG. 1 include increasing or decreasing clock frequency of the communications channel to meet bandwidth requirements or to save power.

Figure 2:
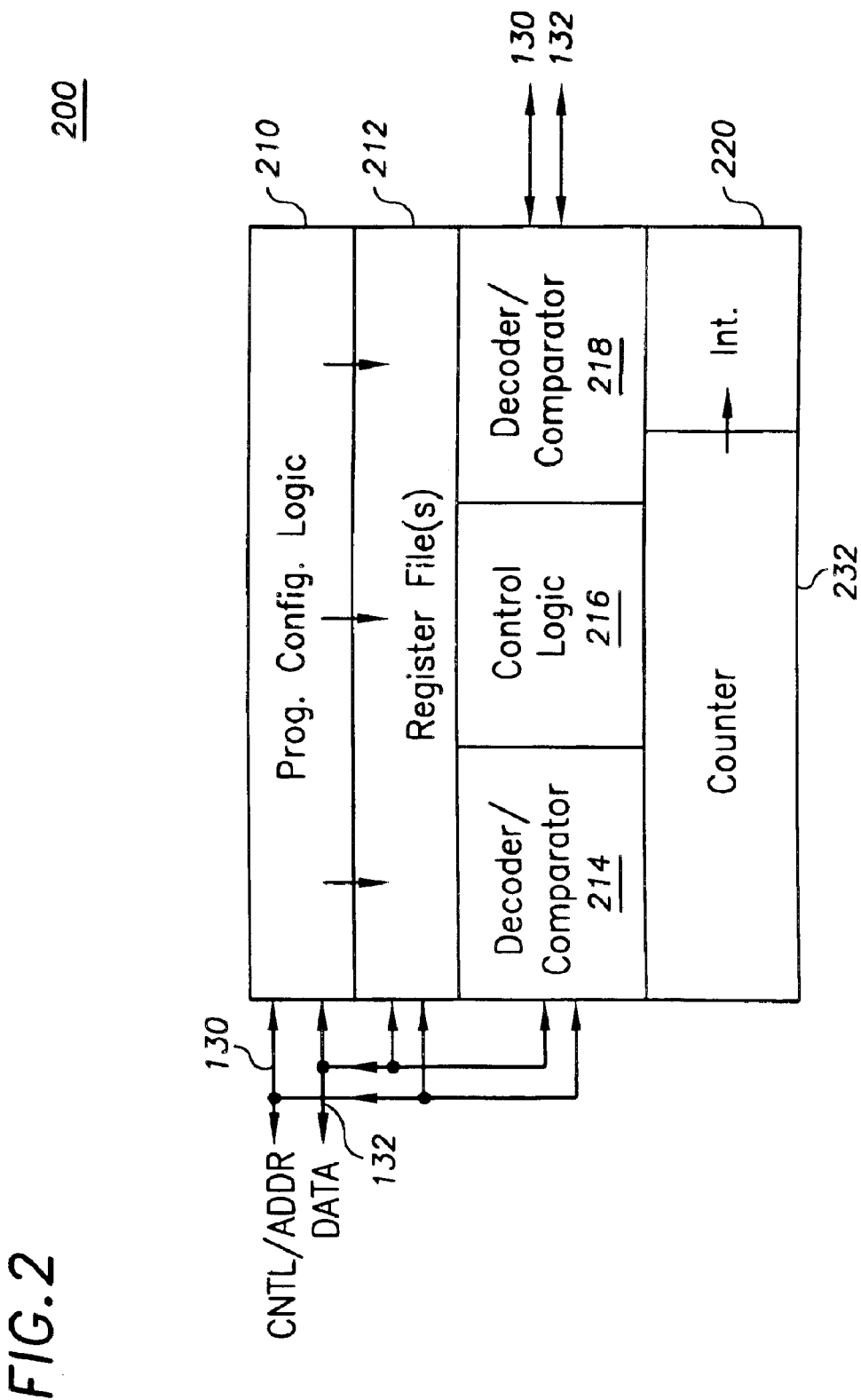
FIG. 2 is a diagram showing an expanded view showing an example bus-monitor circuit, also according to the present invention, that is consistent with the circuit arrangement shown in FIG. 1.

FIG. 2 illustrates an example implementation of a communication-channel monitor 200 for a parallel data bus arrangement such as the busses 130 and 132 of FIG. 1. The monitor 200 includes programmable configuration logic 210 which receives data over the data bus 132 for its initial and subsequent configurations. A circuit 212 having one or more register files is used to hold configuration bits that correspond to an event to be monitored. These configuration bits are then decoded so as to present corresponding expected signals to monitor for by comparing these expected signals to the active bus signals (control, address and/or data) which are provided to the monitor 200 directly from the communication channel. Using control logic 216 for signal delivery and timing coordination, logic decode/comparison circuitry 214 or 218 determines if the monitored signals match the signals that the monitor 200 has been configured to monitor, as programmed in the programmable configuration logic 210. Immediate feedback of a match or when the counter equals a predetermined value, as output from the logic decode/comparison circuitry 218, is provided via an interrupt driver 220. In other applications, a match can be used to simply increment, stop or start the counter with the counter being monitored as indicated above or merely read after a certain period of time.

Another aspect of the monitor 200 is its ability to count the number of a certain type of event or events as programmed into the programmable configuration logic 210. For this purpose, control logic 216 also enables counter circuit 232 which counts each such event or starts/stops the counter in response to such an event. In another embodiment, multiple counters are used with multiple comparators to monitor different events concurrently. It will be appreciated that counter circuit 232 can include more than one counter with each counter assigned for counting a different event detected on the bus.

The present invention should not be considered limited to the particular examples described above. Various modifications, equivalent processes, as well as numerous structures to which the present invention may be applicable fall within the scope of the present invention. For example, multi-chip or single-chip arrangements can be implemented using a similarly constructed one-way or two-way interface for communication between the chip-set arrangements. Such variations may be considered as part of the claimed invention, as fairly set forth in the appended claims.

What is claimed is:

1. In a circuit arrangement having a CPU circuit communicating with another device over a communication channel, a method of monitoring signals on the communication channel, comprising:

providing a reconfigurable circuit coupled to the communication channel;

using the CPU circuit to configure the reconfigurable circuit for monitoring a first event type occurring on the communication channel;

in the reconfigurable circuit, collecting signals passed on the communication channel and reporting back to the CPU circuit data indicative of the first event type occurring on the communication channel; and in response to the data indicative of the monitored event, using the CPU circuit to reconfigure the reconfigurable circuit to monitor for another event type occurring on the communication channel and, thereafter, collecting and evaluating signals passed on the communication channel for the other event.

2. The method of claim 1, further including using the CPU circuit to evaluate and redirect data over the communication channel as a function of and in response to the data indicative of the monitored event.

3. The method of claim 1, wherein the reconfigurable circuit includes a register circuit adapted to respond to configuration data by presenting signals corresponding to expected events to be monitored on the communication channel and further including comparing the collected signals with the signals corresponding to the expected events.

4. The method of claim 3, further including counting the expected events and interrupting the CPU circuit in response to the collected signals matching the expected signals.

5. The method of claim 1, further including interrupting the CPU circuit in response to the data indicative of the monitored event detected by the reconfigurable circuit.

6. The method of claim 1, wherein the reconfigurable circuit includes a programmable processor.

7. The method of claim 1, wherein providing a reconfigurable circuit adapted to measure at least one event type occurring on the communication channel includes configuring the reconfigurable circuit to count said at least one event.

8. The method of claim 1, wherein providing a reconfigurable circuit adapted to measure at least one event type occurring on the communication channel includes configuring the reconfigurable circuit to time the duration of said at least one event.

9. The method of claim 1, wherein the first event type and the other event type are different types of events occurring on the communication channel.

10. The method of claim 1, wherein the first event type and the other event type are the same types of events occurring on the communication channel.

11. The method of claim 1, further including using the CPU circuit to evaluate the data indicative of the monitored event type before reconfiguring the reconfigurable circuit.

12. A circuit arrangement, comprising:
a reconfigurable circuit coupled to the communication channel and adapted to collect signals passed on the communication channel;
a CPU circuit adapted to communicate with another device over a communication channel and adapted to configure the reconfigurable circuit for monitoring a first event type occurring on the communication channel, wherein the reconfigurable circuit is adapted to respond to the CPU circuit by monitoring for the first event type occurring on the communication channel and by reporting back to the CPU circuit data indicative of the first event; and
the CPU circuit further adapted to respond to the data indicative of the monitored event type by reconfiguring the reconfigurable circuit to monitor for another event type occurring on the communication channel and, thereafter, collect and evaluate signals passed on the communication channel for the other event.

13. The circuit arrangement of claim 12, wherein the reconfigurable circuit includes a counter.

14. The circuit arrangement of claim 12, wherein the reconfigurable circuit includes a circuit adapted to decode configuration data by presenting expected signals corresponding to events to be monitored on the communication channel and a comparator circuit adapted to compare the collected signals with the expected signals.

15. The circuit arrangement of claim 14, further including interruption means for interrupting the CPU circuit in response to the collected signals matching the expected signals.

16. The circuit arrangement of claim 12, further including interruption means for interrupting the CPU circuit in response to the collected signals matching the expected signals.

17. The circuit arrangement of claim 12, wherein the CPU circuit includes means for polling the reconfigurable circuit to enable the CPU circuit to read the data indicative of the first event.

18. The circuit arrangement of claim 12, wherein the first event type and the other event type are different types of events occurring on the communication channel.

19. The circuit arrangement of claim 12, wherein the first event type and the other event type are the same types of events occurring on the communication channel.

20. The circuit arrangement of claim 12, wherein the CPU circuit is further adapted to evaluate the data indicative of the monitored event.

21. The circuit arrangement of claim 12, wherein the CPU circuit is further adapted to redirect data over the communication channel as a function of and in response to the data indicative of the monitored event.

22. A circuit arrangement, comprising:
reconfigurable means, coupled to the communication channel, for collecting signals passed on the communication channel;
CPU means for communicating with another device over the communication channel and for configuring the reconfigurable means for monitoring a first event type occurring on the communication channel, the reconfigurable means also for responding to the CPU means by monitoring for the first event type occurring on the communication channel and by reporting back to the CPU means data indicative of the first event; and
the CPU means also for responding to the data indicative of the monitored event type by reconfiguring the reconfigurable means to monitor for another event type occurring on the communication channel and, thereafter, collect and evaluate signals passed on the communication channel for the other event type.

23. A circuit arrangement, comprising:
reconfigurable circuit, coupled to the communication channel, for collecting signals passed on the communication channel;
CPU means for communicating with another device over the communication channel and for configuring the reconfigurable circuit for monitoring a first event type occurring on the communication channel, the reconfigurable circuit also for responding to the CPU means by monitoring for the first event type occurring on the communication channel;
interruption means, coupled to the reconfigurable circuit, for interrupting the CPU circuit in response to the collected signals matching the expected signals; and
the CPU means also for responding to the interruption means by reconfiguring the reconfigurable circuit to monitor for another event type occurring on the communication channel and, thereafter, collect and evaluate signals passed on the communication channel for the other event type.

24. The circuit arrangement of claim 23, wherein the CPU means includes means for evaluating the data indicative of the monitored event.

25. The circuit arrangement of claim 23, wherein the CPU means includes means for redirecting data over the communication channel as a function of and in response to the data indicative of the monitored event.

26. The circuit arrangement of claim 23, wherein the reconfigurable circuit includes multiple comparators for monitoring different events concurrently.

27. The circuit arrangement of claim 26, further including multiple counters, each of said counters being responsive to a respective one of said multiple comparators.

* * * * *